United States Patent
Gueron et al.

(10) Patent No.: US 11,108,552 B1
(45) Date of Patent: Aug. 31, 2021

(54) DATA ENCRYPTION METHOD AND SYSTEM

(71) Applicant: Amazon Technologies, Inc., Seattle, WA (US)

(72) Inventors: Shay Gueron, Haifa (IL); Matthew John Campagna, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 441 days.

(21) Appl. No.: 15/969,611

(22) Filed: May 2, 2018

(51) Int. Cl.
| | |
|---|---|
| H04L 29/06 | (2006.01) |
| H04L 9/08 | (2006.01) |
| H04L 9/06 | (2006.01) |
| H04L 9/32 | (2006.01) |

(52) U.S. Cl.
CPC .......... *H04L 9/0869* (2013.01); *H04L 9/0631* (2013.01); *H04L 9/3242* (2013.01)

(58) Field of Classification Search
CPC .... H04L 9/0869; H04L 9/0631; H04L 9/3242
See application file for complete search history.

(56) References Cited

U.S. PATENT DOCUMENTS

| | | | | | |
|---|---|---|---|---|---|
| 5,956,405 | A * | 9/1999 | Yuval | ................... | H04L 9/0643 |
| | | | | | 380/29 |
| 6,505,301 | B1 * | 1/2003 | Matyas | .............. | G06Q 20/3672 |
| | | | | | 380/255 |
| 7,487,365 | B2 * | 2/2009 | England | .............. | G06F 21/6218 |
| | | | | | 713/193 |
| 7,827,408 | B1 * | 11/2010 | Gehringer | ............. | H04L 9/0631 |
| | | | | | 713/170 |
| 2001/0033656 | A1 * | 10/2001 | Gligor | ................... | H04L 9/0656 |
| | | | | | 380/28 |
| 2002/0174332 | A1 * | 11/2002 | Vialen | ................... | H04L 9/3242 |
| | | | | | 713/152 |
| 2005/0203582 | A1 * | 9/2005 | Healy | ................. | A61N 1/37211 |
| | | | | | 607/31 |
| 2009/0164774 | A1 * | 6/2009 | Sherkin | ................. | H04L 9/3066 |
| | | | | | 713/155 |

(Continued)

OTHER PUBLICATIONS

"Advanced Encryption Standard (AES)," Federal Information Processing Standards Publication 197, Computer Security Standard, Cryptography, Nov. 26, 2001, 51 pages.

(Continued)

*Primary Examiner* — Ghodrat Jamshidi
(74) *Attorney, Agent, or Firm* — Davis Wright Tremaine LLP

(57) ABSTRACT

Plaintext data is encrypted and decrypted using a symmetric encryption algorithm that generates a sequence of pseudorandom values from a cryptographic key. A portion of the sequence of pseudorandom values is discarded. For example, in an embodiment, each value in the sequence of pseudorandom values is truncated by a number of bits. Encryption and decryption is performed by combining plaintext or ciphertext with the truncated sequence of pseudorandom values. In an embodiment, the combination is made by performing a bitwise exclusive or operation between the truncated pseudorandom values and the plaintext or ciphertext. In an embodiment, a number of bits discarded from each value is encoded into a message authentication code which is provided with any resulting ciphertext.

20 Claims, 10 Drawing Sheets

(56) References Cited

U.S. PATENT DOCUMENTS

| | | | | |
|---|---|---|---|---|
| 2012/0170744 | A1* | 7/2012 | Cheng | H04W 12/0017 |
| | | | | 380/270 |
| 2015/0288690 | A1* | 10/2015 | Pal | H04L 9/3242 |
| | | | | 713/181 |
| 2015/0358154 | A1* | 12/2015 | Garcia Morchon | G06F 7/586 |
| | | | | 380/28 |
| 2017/0085540 | A1* | 3/2017 | Avanzi | H04L 9/0877 |
| 2017/0126409 | A1* | 5/2017 | Freudiger | H04L 9/0841 |
| 2017/0373857 | A1* | 12/2017 | Schneider | G10L 19/173 |
| 2018/0139051 | A1* | 5/2018 | Ghosh | H04L 9/0637 |
| 2018/0285539 | A1* | 10/2018 | Agarwal | H04L 63/0861 |

OTHER PUBLICATIONS

Dworkin, M., "Recommendation for Block Cipher Modes of Operation: Galois/Counter Mode (GCM) and GMAC," NIST Special Publication 800-38D, U.S. Department of Commerce, Nov. 2007, 39 pages.

Gueron, S., et al., "AES-GCM-SIV: Nonce Misuse-Resistant Authenticated Encryption," Internet Draft, Internet Engineering Task Force (IETF), Feb. 10, 2018, 39 pages.

Menezes, A.J., et al., Handbook of Applied Cryptography, CRC Press, 1997, 794 pages.

Dang, "Recommendation for Applications Using Approved Hash Algorithms" NIST Special Publication 800-107, Revision 1, National Institute of Standards and Technology (NIST), Aug. 2012, retrieved on Nov. 24, 2015, from http://csrc.nist.gov/publications/nistpubs/800-107-rev1/sp800-107-rev1.pdf, 25 pages.

\* cited by examiner

DATA ENCRYPTION METHOD AND SYSTEM

BACKGROUND

Data security is an important aspect of modern computing environments. In many examples, data security is provided through the use of data encryption. Many types of encryption are well known in the art and are widely used. In general, encryption relies on the use of cryptographic keys. In the case of a symmetric key, the key is accessible to both the sending entity and a receiving entity, and the key is used for both the encryption and decryption operations. In the case of an asymmetric key, the key is split into a private key and a public key. In general, the private key is accessible to the recipient (but not the sender), and the public key may be accessible to all (or at least the sender). The public key may be used to encrypt information, and the private key is generally required to decrypt the encrypted information. Regardless of the type of encryption used, keys can become old and/or overused, leading to a reduction in the level of security provided by the encryption. When this occurs, the cryptographic key is often changed or rotated to a new value. The key rotation process can be very expensive because old keys may need to be stored, data may need to be re-encrypted, and new keys may need to be distributed. In some examples, multiple keys may need to be supported concurrently. For this and other reasons, excessive key rotation can result in significant use of available resources.

BRIEF DESCRIPTION OF THE DRAWINGS

Various techniques will be described with reference to the drawings, in which.

DETAILED DESCRIPTION

Figure 1:
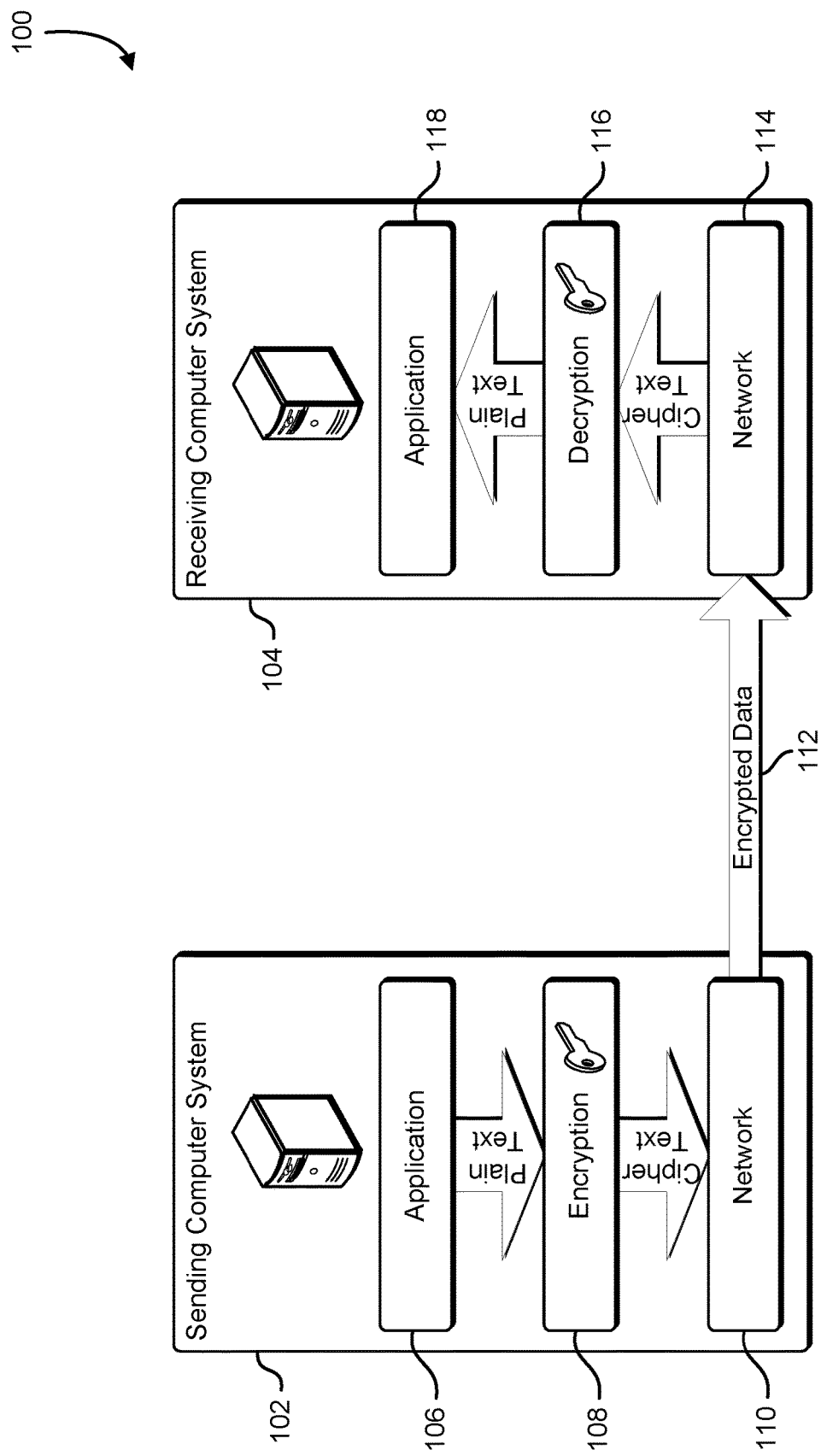
FIG. 1 illustrates an example of a system in which a first computer system encrypts plaintext data and sends the resulting ciphertext to a second computer system which decrypts the ciphertext to recover the plaintext data, in an embodiment.

The present document describes a system that, in various embodiments, reduces the need for key rotation by performing symmetric encryption and decryption of plaintext data using a sequence of truncated pseudorandom values. In an embodiment, a sending computer system and a receiving computer system establish a shared secret that is used to produce a shared cryptographic key. In an embodiment, each computer system uses a counter to generate a sequence of values, and each value in the sequence of values is encrypted to produce a sequence of encrypted counters. In an embodiment, at least a portion of each encrypted counter is removed, truncated, or otherwise disregarded. Both the sending computer system and the receiving computer system generate matching sequences of encrypted counters. In an embodiment, the sending computer system performs an exclusive or ("XOR") operation between a sequence of plaintext values and the sequence of encrypted counters to produce a ciphertext. In an embodiment, the sending computer system transmits the ciphertext to the receiving computer system. In an embodiment, the receiving computer system performs an XOR operation between the ciphertext and the sequence of encrypted counters to reproduce the plaintext.

In an embodiment, the Advanced Encryption Standard ("AES") is a 128-bit block cipher. A block cipher is a function that maps a fixed block size input to a fixed block output as a pseduorandom permutation using a cryptographic key. In an embodiment, such a function is represented as E: 0; $1^k$x0; $1^n \to 0$; $1^n$ where k is the key size in bits, and n is the block size. This can be represented as $E_K(m)=c$ to indicate the encryption of the plaintext message block m by the key K into the ciphertext block c. In general, an advantage to distinguish a pseudorandom permutation from a pseudorandom function is represented as $Adv_{PRP-PRF} = q^2 / 2^{n+1}$. This limitation affects the security bounds on the use of AES in Galois Counter Mode ("GCM"). However, by disregarding a portion of the encoded counters, security against such attacks is improved. In an embodiment, this allows for prolonged use of a cryptographic key without key rotation.

In an embodiment, the sending computer system generates a message authentication code that allows a recipient to confirm that the message has not been altered. In an embodiment, the message authentication code is based on the values of the encrypted counters, the length of the ciphertext, and the number of bits that are disregarded from each encrypted counter. In an embodiment, additional data is sent from the sending computer system to the receiving computer system, and the message authentication code is based at least in part on the additional data. In an embodiment, the sending computer system sends the message authentication code to the receiving computer system, and the receiving computer system confirms that the message authentication code is correct. In an embodiment, if the receiving computer system determines that the message authentication code is incorrect, the receiving computer system determines that the ciphertext has been tampered with, and any plaintext produced is not authenticated.

As one skilled in the art will appreciate in light of this disclosure, certain embodiments are capable of achieving certain advantages, including some or all of the following: increased security of counter-mode encryption algorithms, reduction in the amount of key rotation necessary to maintain a given level of security, and reduced data storage costs and key management costs associated with key rotation. In an embodiment, systems and methods described herein may be used to modify the Galois Counter Mode ("GCM") algorithm on a block cipher to move beyond the birthday bound of the block size security bounds against a pseudorandom permutation ("PRP") distinguisher from a pseduorandom function ("PRF").

FIG. 1 illustrates a an example of a system in which a first computer system encrypts plaintext data and sends the resulting ciphertext to a second computer system which decrypts the ciphertext to recover the plaintext data, in an embodiment. In an embodiment, a system 100 includes a sending computer system 102 and a receiving computer system 104. In an embodiment, the sending computer system 102 and the receiving computer system 104 may be server computer systems, client computer systems, laptop computer systems, handheld devices, cellular phones, network-connected peripherals, virtual computer systems, virtual servers, application runtime environments, or any combination of the above. In an embodiment, the sending computer system 102 and the receiving computer system 104 are connected by a computer network such as an Ethernet network, a token ring network, a fiber-optic network, an optical network, or a wireless radiofrequency network. In an embodiment, the sending computer system 102 and the receiving computer system 104 are connected via a serial interface such as a USB interface, FireWire interface or RS-232 interface.

In an embodiment, the sending computer system 102 includes one or more processors and a memory containing instructions that, when executed by the one or more processors, implement an application 106. In an embodiment, the application 106 generates unencrypted plaintext data which is provided to an encryption processor 108. In an embodiment, the encryption processor 108 is comprised of executable instructions stored in memory that are executed on the one or more processors of the sending computer system 102. In an embodiment, the encryption processor 108 is a crypto processor coupled to the sending computer system 102. In an embodiment, the encryption processor 108 is a hardware security module ("HSM") containing non-exportable memory and a crypto processor. In an embodiment, the encryption processor 108 acquires the plaintext from the application 106, and encrypts the plaintext using a cryptographic key to produce a ciphertext.

In an embodiment, the ciphertext is transmitted from the sending computer system 102 to the receiving computer system 104 via a network interface 110. In an embodiment, the network interface 110 is a network interface card ("NIC") that is connected to a computer network. In an embodiment, the ciphertext is written by the sending computer system 102 to a storage device such as a disk drive or solid-state memory that is accessible to the receiving computer system 104, and the receiving computer system 104 acquires the ciphertext by reading the ciphertext from the storage device.

In an embodiment, the receiving computer system 104 receives the ciphertext from the sending computer system at a network interface 114. In an embodiment, the network interface 114 may be a network interface card, serial interface card, wireless network interface card, or storage device that is connected to the sending computer system 102. In an embodiment, the encrypted data 112 is provided to a decryption processor 116.

In an embodiment, the decryption processor 116 uses a cryptographic key that matches the cryptographic key used by the sending computer system 102 to encrypt the plaintext. In an embodiment, the sending computer system 102 and the receiving computer system 104 both acquire matching cryptographic keys by performing a key exchange algorithm. In an embodiment, the key exchange algorithm is the Diffie Hellman algorithm. In an embodiment, the key exchange algorithm uses a public-private key pair to transmit a shared secret from one of the computer systems to the other. In yet another embodiment, the cryptographic key is communicated from one computer system to the other on physical computer readable media.

In an embodiment the ciphertext is provided to the decryption processor 116, and the decryption processor 116 uses the cryptographic key to decrypt the ciphertext and reconstruct the plaintext. In an embodiment, the decryption processor 116 provides the plaintext to a receiving application 118.

In an embodiment, the encryption processor 108 produces a message authentication code that can be used to verify the integrity of the ciphertext. In an embodiment, the message authentication code is provided to the receiving computer system 104 by the sending computer system 102. In an embodiment, the decryption processor 116 receives the message authentication code from the sending computer system 102. In an embodiment, the decryption processor 116 recalculates the message authentication code using the ciphertext, and compares the recalculated message authentication code against the message authentication code provided by the sending computer system 102. In an embodiment, if the message authentication code recalculated by the receiving computer system 104 matches the message authentication code provided by the sending computer system 102, the decryption processor 116 determines that the ciphertext is valid, and provides ciphertext to the receiving application 118. In an embodiment, if the decryption processor 116 determines that the message authentication code provided by the sending computer system 102 does not match the reconstructed message authentication code, the decryption processor 116 determines that the ciphertext is not valid, and sends an indication of an error to the receiving application 118.

Figure 2:
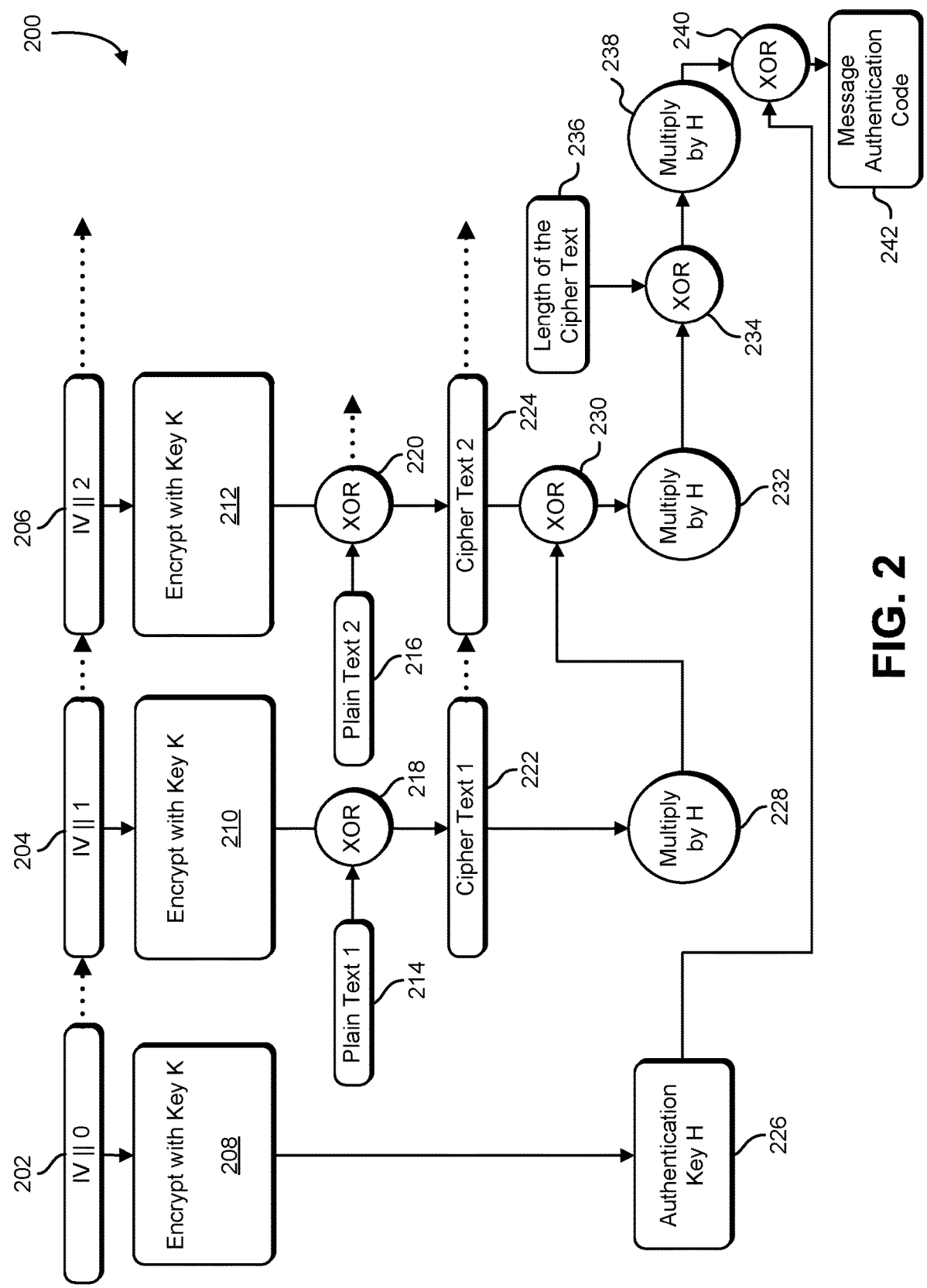
FIG. 2 illustrates an example of a system that uses Galois Counter Mode ("GCM") to encrypt plaintext data and produce a ciphertext and a message authentication code, in an embodiment.

FIG. 2 illustrates an example of a system that uses Galois Counter Mode to encrypt plaintext data and produce a ciphertext and a message authentication code, in an embodiment. A process diagram 200 illustrates an embodiment of a mechanism for performing an AES-GCM encryption process. In an embodiment, the process generates a sequence of counters that include a first counter 202, a second counter 204, and a third counter 206. In an embodiment, each counter is a combination of an initialization value (IV), and an integer which is incremented for each successive counter value. In an embodiment, the initialization value and the integer may be combined by concatenation or by an XOR operation. In an embodiment, the term counter refers to members of a sequence of values. In some examples, the counters may be referred to as "counter values" or more generally as a "pseudorandom sequence." In an embodiment, each initialization vector is encrypted with the cryptographic key (K). At block 208, the first counter 202 is encrypted with the cryptographic key, at block 210, the second counter 204 is encrypted with the cryptographic key, and at block 212, the third counter 206 is encrypted with the cryptographic key.

In an embodiment, the plaintext is XORed with the encrypted counters to produce a ciphertext. In an embodiment, the plaintext is divided into chunks, each chunk having a number of bits equal to the length of each encrypted counter. For example, in an embodiment, the counters are 128-bit values, the encrypted counters are 128-bit values, and the plaintext is divided into 128-bit chunks. In an embodiment, a first chunk of plaintext 214 is combined using an XOR operator 218 with the second encrypted counter 210 to produce a first piece of ciphertext 222. In an embodiment, a second chunk of plaintext 216 is combined using an XOR operator 220 with the third encrypted counter 212 to produce a second piece of ciphertext 224. In an embodiment, each piece of ciphertext has a length equal to the length of each encrypted counter which is equal to the length of each counter. In an embodiment, the pieces of ciphertext are concatenated with each other to produce a single ciphertext that is the encoded version of the plaintext.

In an embodiment, the message authentication code is generated that allows a recipient of the ciphertext to confirm that the ciphertext is authentic. In an embodiment, the first counter 202 is encrypted with the cryptographic key K to form an authentication key H 226. In an embodiment, the authentication key H 226 is multiplied 228 by the first piece of ciphertext 222. In an embodiment, the result of the multiplication is XORed 230 with the second piece of ciphertext 224. In an embodiment, the result of this multiplication is multiplied 232 by the authentication key H 226, and XORed 234 with a length of the ciphertext 236. In an embodiment, the result of XOR 234 is multiplied by H 238, and then XORed 240 with the authentication key H 226 to produce the message authentication code 242. In an embodiment, the resulting message authentication code 242 may be used by a recipient of the ciphertext to confirm that the initialization vector, ciphertext, and ciphertext length have not been tampered with prior to decryption.

Figure 3:
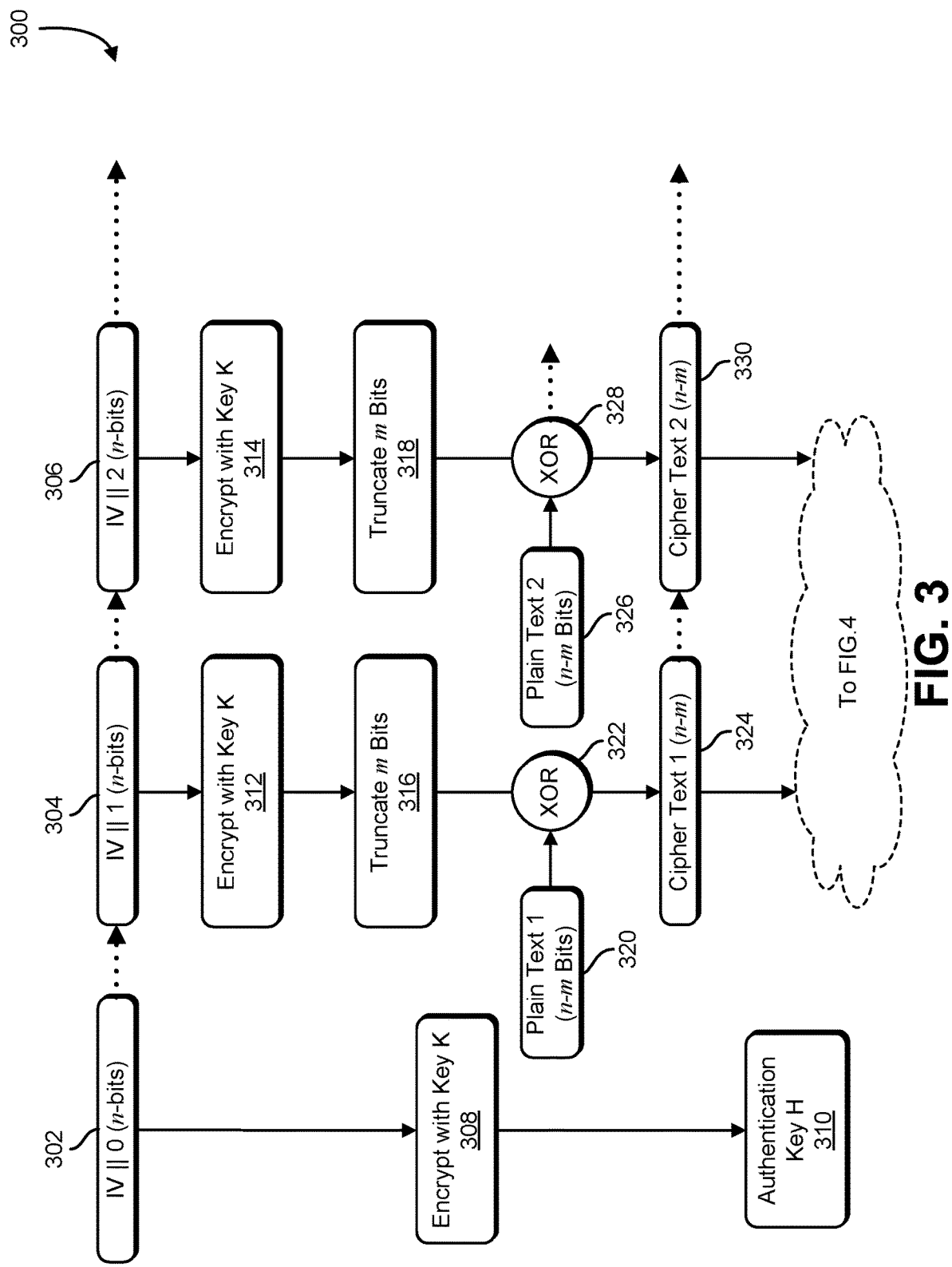
FIG. 3 illustrates an example of a system that uses truncated encrypted counters to encode plaintext data and produce a ciphertext, in an embodiment.

FIG. 3 illustrates an example of a system that uses truncated encrypted counters to encode plaintext data and produce a ciphertext, in an embodiment. A process diagram 300 illustrates an embodiment of a process for encrypting data using truncated encrypted counters. In an embodiment, a sequence of counters based on an initialization value is generated. In the illustrated example, the sequence of counters includes a first counter value 302, a second counter value 304, and a third counter value 306. In an embodiment, each counter is a length of n bits. In an embodiment, the first counter value 302 is encrypted 308 with the cryptographic key K to produce an authentication key H 310. In an embodiment, the second counter value 304 is encrypted 312 with the cryptographic key K, and the third counter value 306 is encrypted 314 with the cryptographic key K. In an embodiment, at least a portion of each encrypted counter is discarded, masked, truncated, disregarded, ignored, or otherwise excluded from the remainder of the encryption process. In an embodiment, a number of bits m are truncated from each encrypted counter. In an embodiment, at block 316, m bits are truncated from the second encrypted counter, and at block 318, m bits are truncated from the third encrypted counter. In an embodiment, a portion of each encrypted counter may be discarded by identifying particular value ranges that may not correspond to particular bits. In an embodiment, a portion of each encrypted counted may be masked with a logical AND or OR operator.

In an embodiment, the truncated encrypted counters are combined with plaintext using an XOR operation to produce a ciphertext. In an embodiment, each truncated encrypted counter has n-m bits, and the plaintext is divided into a plurality of chunks, each of which also has n-m bits. In an embodiment, the first truncated encrypted counter is XORed 322 with a first plaintext chunk 320 to form a first piece of ciphertext 324, and the second truncated encrypted counter is XORed 328 with a second plaintext chunk 326 to produce a second piece of ciphertext 330. In an embodiment, the pieces of ciphertext are concatenated together to form a ciphertext that can be used by a recipient to reconstruct the plaintext using the cryptographic key. In an embodiment, a message authentication code is generated using a process illustrated below in FIG. 4.

Figure 4:
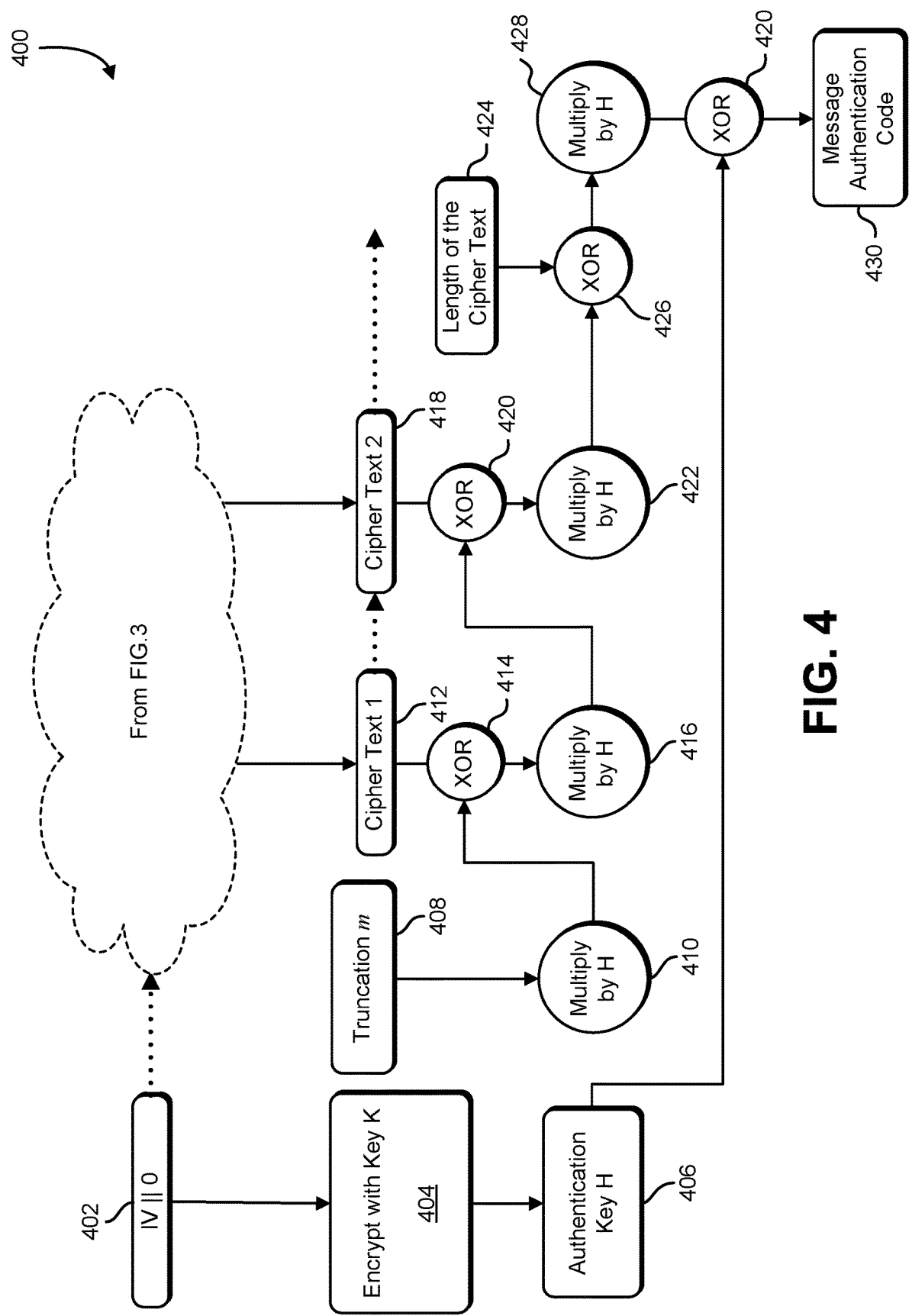
FIG. 4 illustrates an example of a system that produces a message authentication code for use when encrypting data with truncated encrypted counters, in an embodiment.

FIG. 4 illustrates an example of a system that produces a message authentication code for use when encrypting data with truncated encrypted counters, in an embodiment. A process diagram 400 illustrates an embodiment of a process for generating a message authentication code for the encryption process illustrated in FIG. 3. In an embodiment, a first counter value 402 comprised of a combination of an initialization vector and an initial counter value is encrypted 404 using the cryptographic key used above to produce an authentication key H 406. In an embodiment, the initial counter value 402 is encrypted using AES. As illustrated and described with respect to FIG. 3, each counter is encrypted and truncated by m bits.

In an embodiment, the message authentication code is generated by combining a number of bits that are truncated m 408, the ciphertext generated in FIG. 3, the length of the ciphertext, and the authentication key H 406. In an embodiment, the number of bits that are truncated m 408 is multiplied by H 410, and the result is XORed 414 with a first chunk of ciphertext 412. In an embodiment, the result of the XOR operation is multiplied by H 416, and the result is XORed 420 with a second chunk of ciphertext 418. In an embodiment, the result of this XOR operation is multiplied by H 422 and then XORed 426 with a length of the ciphertext 424. In an embodiment, the result of the XOR operation is multiplied by H 428, and the result is XORed 420 with the authentication key H 406 to produce the message authentication code 430.

In an embodiment, additional data may be transmitted with the ciphertext and the message authentication code. In an embodiment, the additional data and the length of the additional data may be added to the message authentication code to provide assurance that the additional data is authentic and has not been modified before it was received by the recipient.

In an embodiment, the process illustrated in FIGS. 3 and 4 may be used to decrypt plaintext data by reversing the positions of the ciphertext and the plaintext data.

Figure 5:
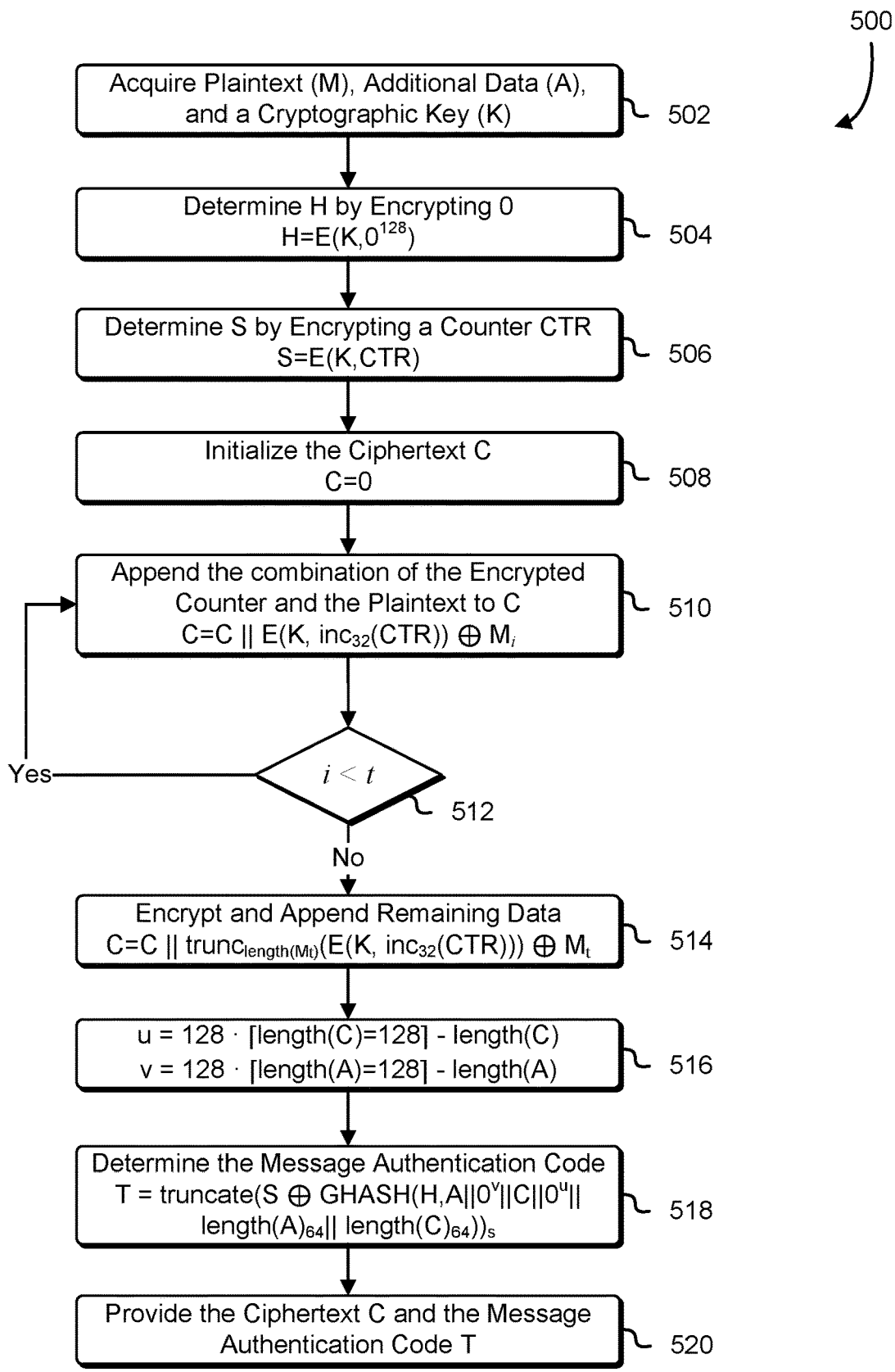
FIG. 5 illustrates an example of a process that, as a result of being performed by a computer system, uses Galois Counter Mode to encrypt data and produce ciphertext and a message authentication code, in an embodiment.

FIG. 5 illustrates an example of a process that, as a result of being performed by a computer system, uses Galois Counter Mode to encrypt data and produce ciphertext and a message authentication code, in an embodiment. A flowchart 500 illustrates a process that encrypts plaintext data using a GCM encryption algorithm. In an embodiment, the process begins at block 502 with the computer system acquiring a plaintext M, a cryptographic key K, and additional authenticated data A. In an embodiment, the message $M=M_0$; $M_1, \ldots M_t$, $M_i$ is an n-bit block for i<t, and $M_t$ may be less than n bits. In an embodiment, the cryptographic key K is a symmetric key accessible to the intended recipient and the computer system. In an embodiment, the cryptographic key K may be expressed as $K^{\$} \leftarrow \{0; 1\}^k$.

In an embodiment, at block 504, the computer system determines an authentication key $H=E(K, 0^{128})$ where E is an n-bit block cipher represented as E: $\{0; 1\}^k \times \{0; 1\}^n \to \{0; 1\}^n$. In an embodiment, at block 506, the computer computes S as $S=E(K,CTR)$ where CTR is an initial k-bit counter value.

In an embodiment, at block 508, the computer system initializes the ciphertext to zero or an empty byte string, and begins a loop that generates the ciphertext. In an embodiment, at block 510, the computer system increments the counter CTR and a loop variable i, and then encrypts the counter which is XORed with a portion of the plaintext message. In an embodiment, encryption of each portion of the plaintext message may be represented as $C=C\|E(K, inc_{32}(CTR)) \oplus M_i$ where C is the resulting ciphertext. In an embodiment, at decision block 512, the system determines whether there is additional plaintext to be encrypted by determining if i is less than t. If i is less than t, and there is additional plaintext to be processed, execution returns to block 510 and the next portion of the plaintext is encrypted. If i is not less than t, execution advances to block 514 and the system processes the remaining piece of plaintext message to produce the final ciphertext as follows $C=C\|trunc_{length(Mt)}(E(K, inc_{32}(CTR))) \oplus M_t$. In an embodiment, $inc_{32}$ is an incrementer function that increases an n-bit value by adding 1 modulo $2^32$ of the lowest 32-bits, such as the incrementer function defined in GCM.

In an embodiment, generation of the message authentication code begins at block 516. In an embodiment, at block 516, the system determines two intermediate variables u and v as follows:

$$u=128\cdot\lceil length(C)=128\rceil-length(C)$$

$$v=128\cdot\lceil length(A)=128\rceil-length(A)$$

In an embodiment, at block 518, the message authentication code T is determined using a GHASH function, where the bit length of the message authentication code s is less than n. GHASH is a hash function, such as the hash function defined for GCM, GHASH: $\{0; 1\}^n \times \{0; 1\}^* \to \{0; 1\}^n$. In an embodiment, the message authentication code T is determined as T=truncate (S $\oplus$GHASH(H,A$\|0^v\|C\|0^u\|$length(A)$_{64}\|$ length(C)$_{64}$))$_s$. In an embodiment, at block 520, the ciphertext C and the message authentication code T are provided to a recipient. In an embodiment, the recipient has access to a matching cryptographic key K and is able to authenticate the ciphertext using the message authentication code T.

Figure 6:
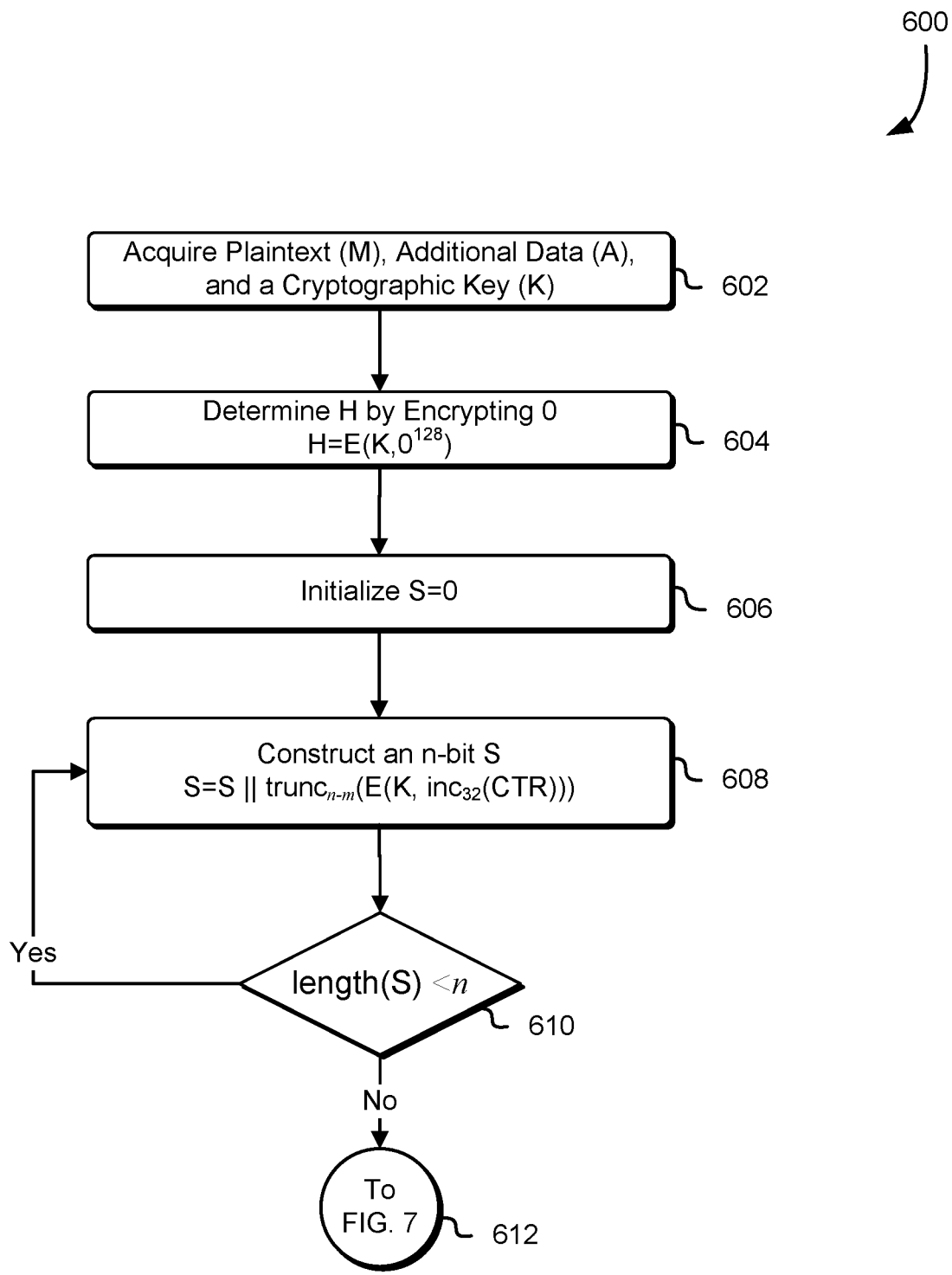
FIG. 6 illustrates a first part of an example of a process that, as a result of being performed by a computer system, encrypts data using truncated counters and produces ciphertext and a message authentication code, in an embodiment.

FIG. 6 illustrates a first part of an example of a process that, as a result of being performed by a computer system, encrypts data using truncated counters and produces ciphertext and a message authentication code, in an embodiment. A flowchart 600 illustrates an embodiment of a first portion of a process that encodes plaintext data M to produce a ciphertext C using a cryptographic key K. In an embodiment, at block 602, the computer system acquires the plaintext data M and cryptographic key K. In an embodiment, additional authenticated data A may also be provided. In an embodiment, the system generates a message authentication code T, which allows a recipient to authenticate the ciphertext C and the additional data A. In an embodiment, the process uses a sequence of counters CTR of length n, encodes the counters and truncates a number of bits m from the encoded counters such that m<n. In an embodiment, the plaintext message $M=M_0, M_1, M_2 \ldots$ n where $M_i$ is an n-m block for i<t and $M_t$ is a string of at most n-m bits. In an embodiment, the message authentication code T has a length s which is less than or equal to n.

In an embodiment, at block 604, the computer system determines an authentication key $H=E(K, 0^{128})$ where E is an n-bit block cipher represented as E: $\{0; 1\}^k \times \{0; 1\}^n \to \{0; 1\}^n$. In an embodiment, at block 606, the computer initializes the value of S to 0, and initiates a loop to determine an n-bit value of S. In an embodiment, at block 608, the S is modified by concatenating n-m bits as follows $S=S\|trunc_{n-m}(E(K, inc_{32}(CTR)))$. In an embodiment, the counter CTR is advanced by the $inc_{32}$ function, and at decision block 610 the computer system determines whether the length of S is less than n. If the length of S is less than n, execution returns to block 608 and additional bits are concatenated to S. If the length of S is not less than n, execution continues to a connection point 612, which links to FIG. 7.

Figure 7:
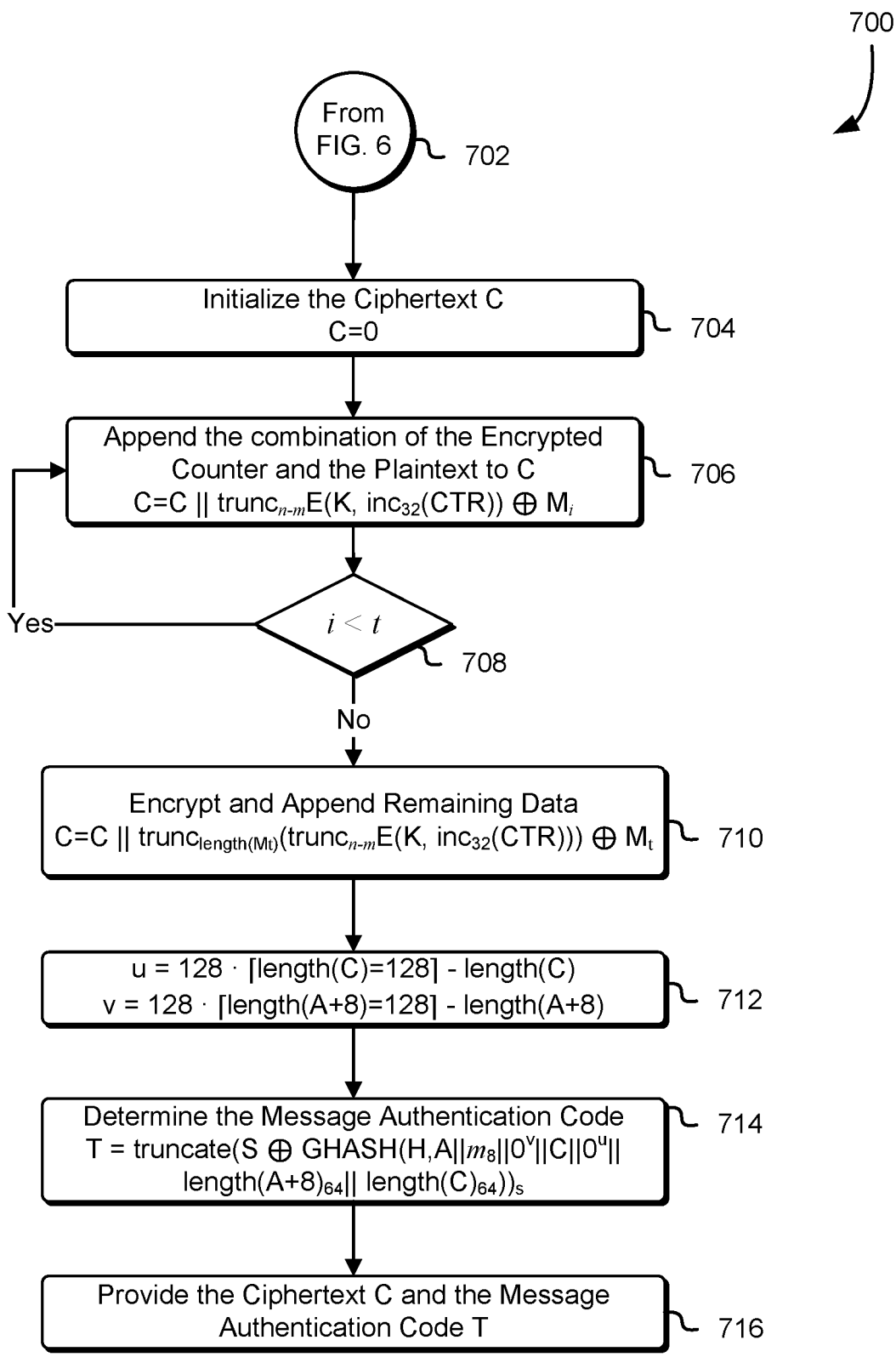
FIG. 7 illustrates a second part of an example of a process that, as a result of being performed by a computer system, encrypts data using truncated counters and produces ciphertext and a message authentication code, in an embodiment.

FIG. 7 illustrates a second part of an example of a process that, as a result of being performed by a computer system, encrypts data using truncated counters and produces ciphertext and a message authentication code, in an embodiment. A flowchart 700 illustrates an embodiment of a second portion of a process that encrypts plaintext data. In an embodiment, execution continues at 702 from a corresponding connection on FIG. 6. In an embodiment, at block 704, the computer system initializes the ciphertext to zero or an empty byte string and begins a loop that generates the ciphertext. In an embodiment, at block 706, the computer system increments the counter CTR and a loop variable i and encrypts the counter. In an embodiment, the encrypted counter is truncated, and the truncated counter is XORed with a portion of the plaintext message. In an embodiment, encryption of each portion of the plaintext message may be represented as $C=C\|trunc_{n-m}(E(K, inc_{32}(CTR)) \oplus M_i)$ where C is the resulting ciphertext. In an embodiment, at decision block 708, the system determines whether there is additional plaintext to be encrypted by determining if i is less than t. If i is less than t, and there is additional plaintext to be processed, execution returns to block 706 and the next portion of the plaintext is encrypted. If i is not less than t, execution advances to block 710 and the system processes the remaining piece of plaintext message to produce the final ciphertext as follows $C=C\|trunc_{length(Mt)}(trunc_{n-m}E(K, inc_{32}(CTR))) \oplus M_t$. In an embodiment, $inc_{32}$ is an incrementer function that increases an n-bit value by adding 1 modulo $2^32$ of the lowest 32-bits, such as the incrementer function defined in GCM.

In an embodiment, generation of the message authentication code begins at block 712. In an embodiment, at block 712, the system determines two intermediate variables u and v as follows:

$$u=128\cdot\lceil length(C)=128\rceil-length(C)$$

$$v=128\cdot\lceil length(A+8)=128\lceil-length(A+8)$$

In an embodiment, at block 714, the message authentication code T is determined using a GHASH function, where the bit length of the message authentication code s is less than n. GHASH is a hash function, such as the hash function defined for GCM, GHASH: $\{0; 1\}^n \times \{0; 1\}^* \to \{0; 1\}^n$. In an embodiment, the message authentication code T is determined as T=truncate(S $\oplus$GHASH(H,A$\|m_8\|0^v\|C\|0^u\|$length(A+8)$_{64}\|$length(C)$_{64}$))$_s$ where $m_8$ is m represented as an 8-bit value. In an embodiment, at block 716, the ciphertext C and the message authentication code T are provided to a recipient. In an embodiment, the recipient has access to a matching cryptographic key K and is able to authenticate the ciphertext using the message authentication code T.

Figure 8:
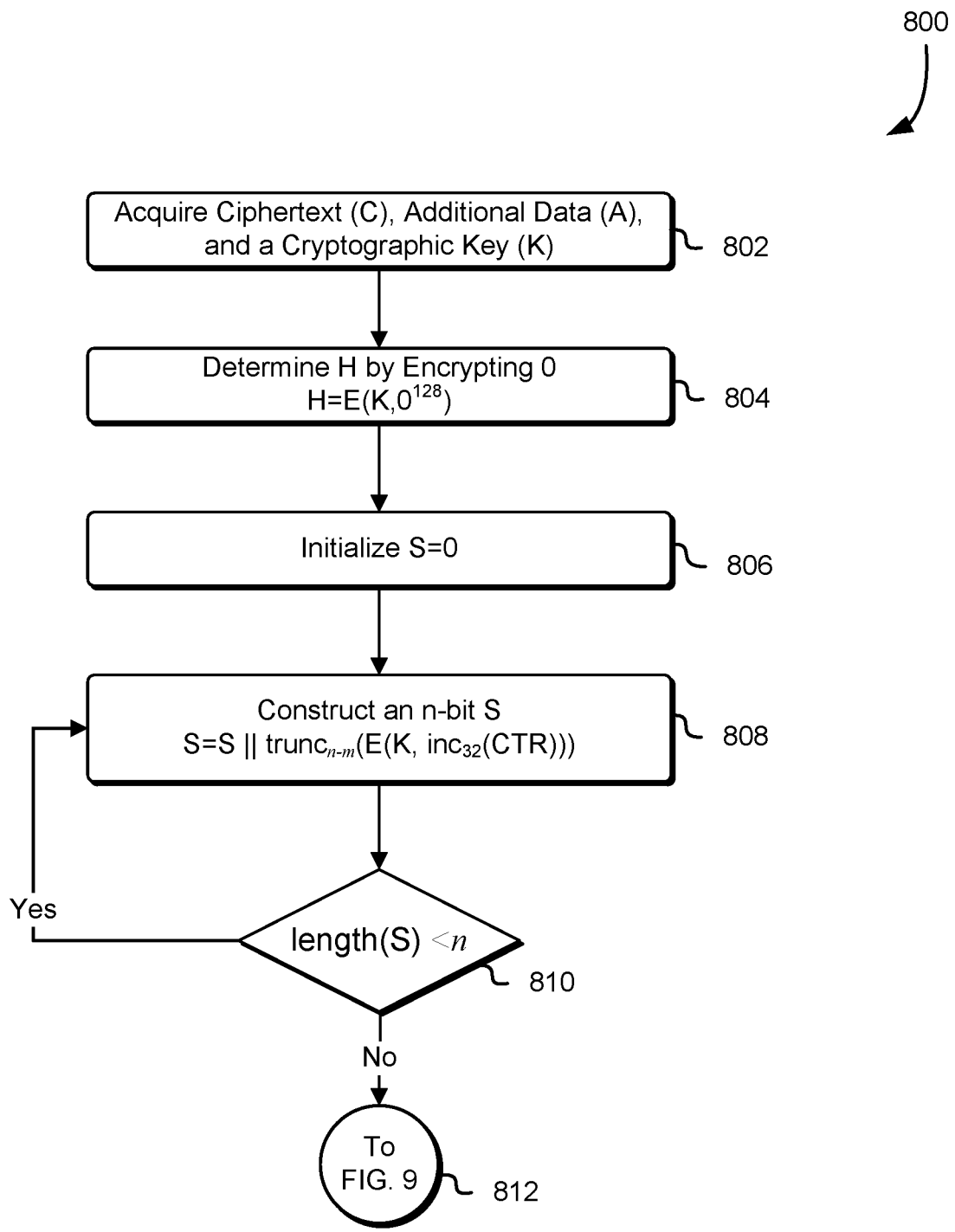
FIG. 8 illustrates a first part of an example of a process that, as a result of being performed by a computer system, uses truncated counters to decrypt ciphertext and produces plaintext, in an embodiment.

FIG. 8 illustrates a first part of an example of a process that, as a result of being performed by a computer system, uses truncated counters to decrypt ciphertext and produces plaintext, in an embodiment. A flowchart 800 illustrates an embodiment of a first portion of a process that decodes a ciphertext C using a cryptographic key K to recreate a plaintext data M. In an embodiment, at block 802, the computer system acquires the ciphertext C and the cryptographic key K. In an embodiment, additional authenticated data A may also be acquired. In an embodiment, the system generates a message authentication code T', which is compared to a received message authentication code T to confirm that the ciphertext C and the additional data A have not been tampered with or corrupted. In an embodiment, the process uses a sequence of counters CTR of length n, encodes the counters, and truncates a number of bits m from the encoded counters where m<n. In an embodiment, the ciphertext C=$C_0$, $C_1$, $C_2$ ... $C_t$ where $C_i$ is an n–m block for i<t and $C_t$ is less than or equal to n-m bits. In an embodiment, the message authentication code T has a length s which is less than or equal to n.

In an embodiment, at block 804, the computer system determines an authentication key H=E(K, $0^{128}$) where E is an n-bit block cipher represented as E: $\{0;1\}^k \times \{0;1\}^n \to \{0;1\}^n$. In an embodiment, at block 806, the computer initializes the value of S to 0, and initiates a loop to determine an n-bit value of S. In an embodiment, at block 808, the S is modified by concatenating n-m bits as follows S=S||$\text{trunc}_{n-m}$(E(K, $\text{inc}_{32}$(CTR))). In an embodiment, the counter CTR is advanced by the $\text{inc}_{32}$ function, and at decision block 810 the computer system determines whether the length of S is less than n. If the length of S is less than n, execution returns to block 808 and additional bits are concatenated to S. If the length of S is not less than n, execution continues to a connection point 812, which links to FIG. 9.

Figure 9:
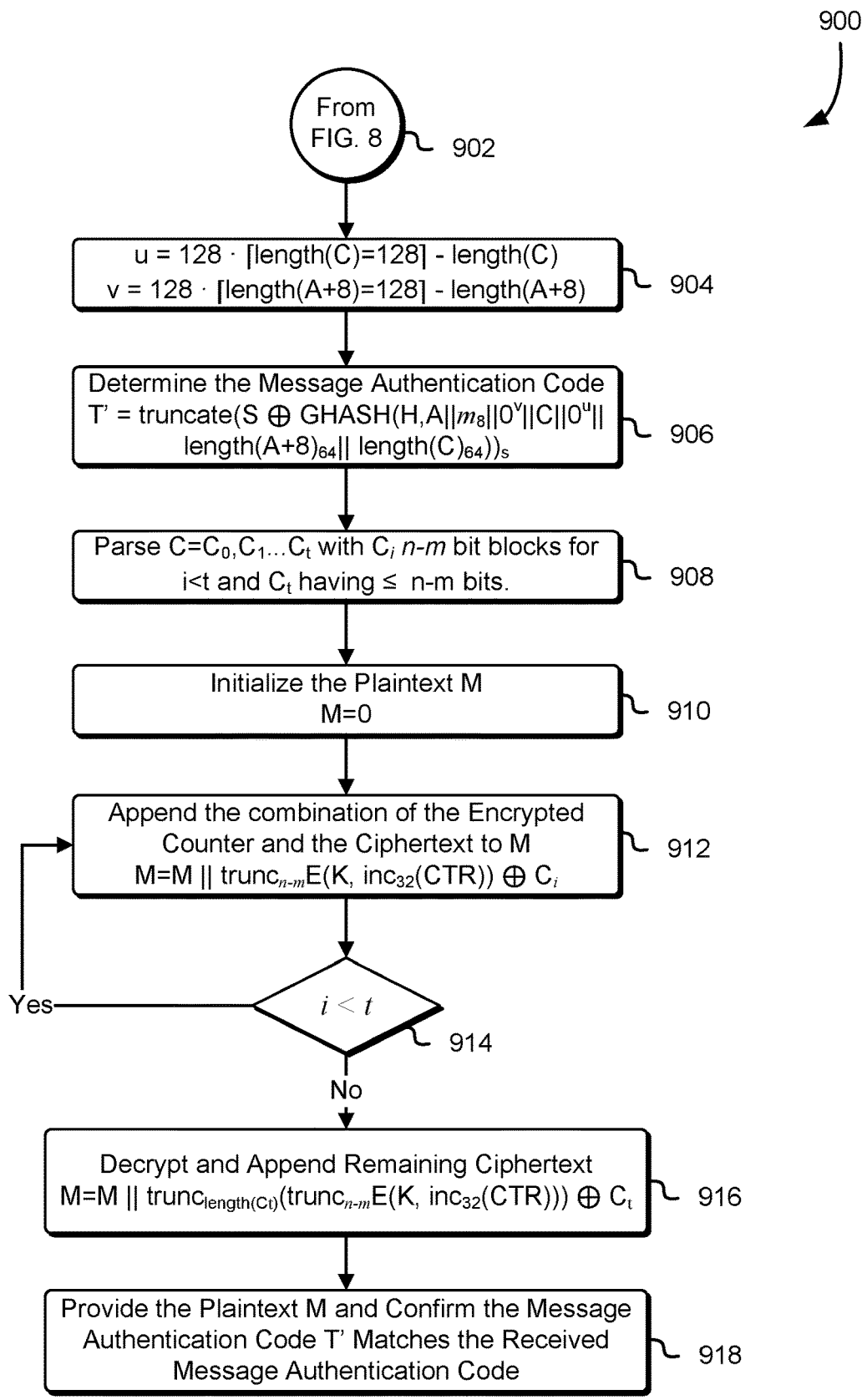
FIG. 9 illustrates a second part of an example of a process that, as a result of being performed by a computer system, uses truncated counters to decrypt ciphertext and produces plaintext, in an embodiment.

FIG. 9 illustrates a second part of an example of a process that, as a result of being performed by a computer system, uses truncated counters to decrypt ciphertext and produces plaintext, in an embodiment. A flowchart 900 illustrates an embodiment of a second portion of a process that decrypts ciphertext to reproduce plaintext data. In an embodiment, execution continues at 902 from a corresponding connection on FIG. 8.

In an embodiment, generation of the message authentication code T' begins at block 904. In an embodiment, at block 904, the system determines two intermediate variables u and v as follows:

$$u=128\cdot\lceil \text{length}(C)=128\rceil-\text{length}(C)$$

$$v=128\cdot\lceil \text{length}(A+8)=128\rceil-\text{length}(A+8)$$

In an embodiment, at block 906, the message authentication code T' is determined using a GHASH function, where the bit length of the message authentication code s is less than n. GHASH is a hash function, such as the hash function defined for GCM, GHASH: $\{0;1\}^n \times \{0;1\}^* \to \{0;1\}^n$. In an embodiment, the message authentication code T is determined as T=truncate(S ⊕GHASH(H,A||$m_8$||$0^v$||C||$0^u$||length $(A+8)_{64}$||length$(C)_{64}$))$_s$ where $m_8$ is m represented as an 8-bit value. In an embodiment, the message authentication code T' is compared to a message authentication code T that is provided with the ciphertext. If the determined message authentication code T' matches the received message authentication code T, the computer system determines that the ciphertext and additional data is authentic.

In an embodiment, at block 908, the computer system parses the ciphertext into blocks where each block has n–m bits, and the final block has less than or equal to n-m bits. In an embodiment, the blocks of ciphertext are combined with the encrypted counters to reproduce the plaintext M.

In an embodiment, at block 910, the computer system initializes the plaintext M to zero or an empty byte string and begins a loop that generates the plaintext. In an embodiment, at block 912, the computer system increments the counter CTR and a loop variable i, and encrypts the counter. In an embodiment, the encrypted counter is truncated, and the truncated encrypted counter is XORed with a portion of the ciphertext. In an embodiment, decryption of each portion of the ciphertext may be represented as M=M||$\text{trunc}_{n-m}$E(K, $\text{inc}_{32}$(CTR))⊕$M_i$, where M is the reconstructed plaintext. In an embodiment, at decision block 914, the system determines whether there is additional plaintext to be encrypted by determining if i is less than t. If i is less than t, and there is additional plaintext to be processed, execution returns to block 912 and the next portion of the ciphertext is decrypted. If i is not less than t, execution advances to block 916 and the system processes the remaining piece of ciphertext message to produce the final plaintext as follows M=M||$\text{trunc}_{length(C_t)}$($\text{trunc}_{n-m}$E(K, $\text{inc}_{32}$(CTR))) ⊕$C_t$. In an embodiment, $\text{inc}_{32}$ is an incrementer function that increases an n-bit value by adding 1 to the lowest 32-bits, modulo $2^{32}$, such as the incrementer function defined in GCM.

In an embodiment, at block 918, the computer system provides the plaintext M and any additional data A to a recipient. In an embodiment, if the determined message authentication code T' does not match the message authentication code T provided by the sender, the computer system provides an indication of an error to the recipient. In an embodiment, a mismatch between the message authentication code T and T' indicates a lack of integrity in either the received ciphertext or the additional data.

Figure 10:
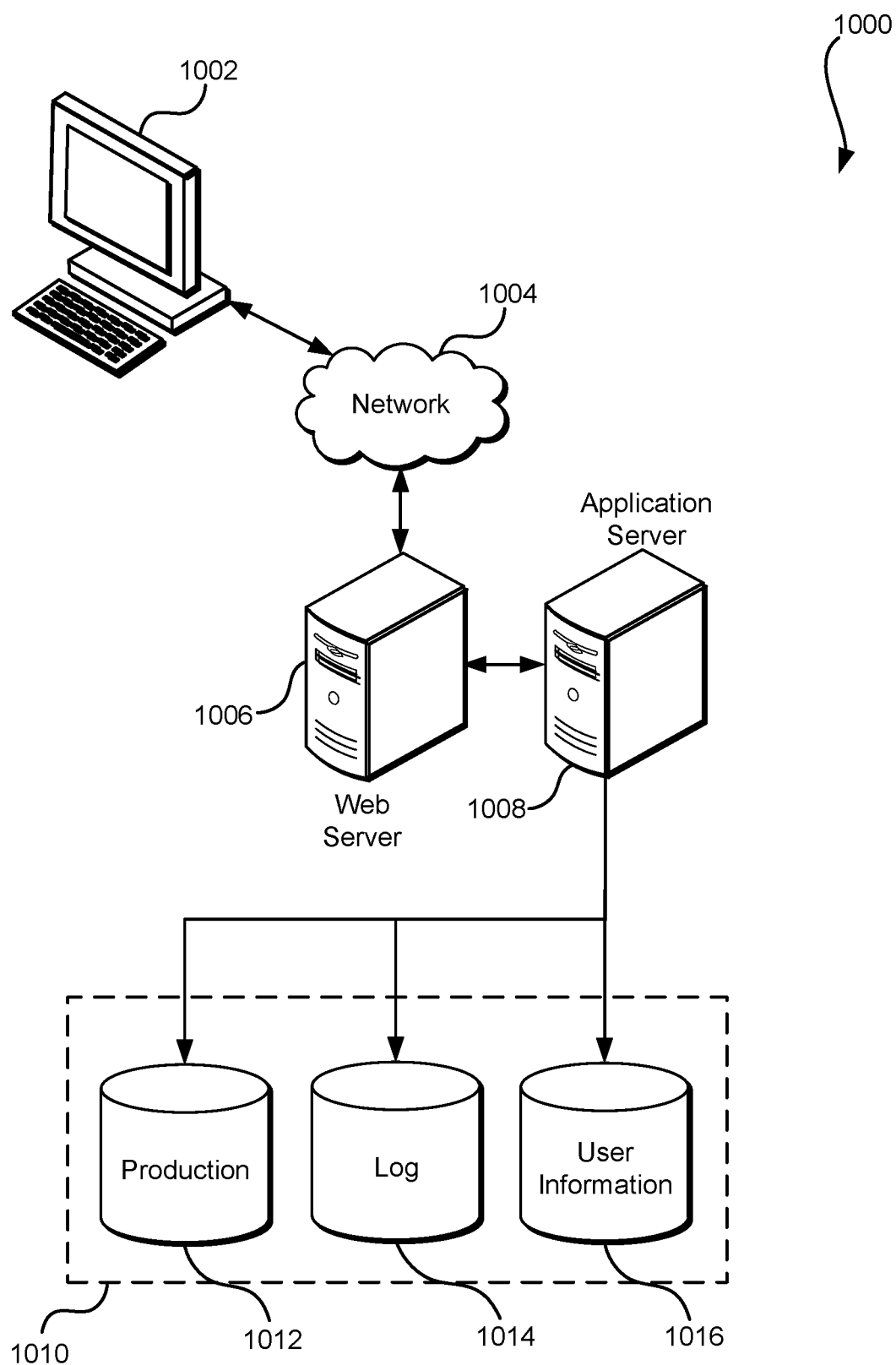
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto and the application server 1008 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In an embodiment, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, Galois/Counter (GCM) mode.

In an embodiment, numerous variations utilize symmetric and/or asymmetric cryptographic primitives. In an embodiment, symmetric key algorithms include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). In an embodiment, symmetric key algorithms include those used to generate output of one way functions and include algorithms that utilize hash-based message authentication codes (HMACs), message authentication codes (MACs) in general, PBKDF2 and Bcrypt. In an embodiment, asymmetric key algorithms include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms may include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. In an embodiment, other algorithms and combinations of algorithms are also considered as being within the scope of the present disclosure and the above is not intended to be an exhaustive list.

In an embodiment, the term "digital signature" includes information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, in an embodiment, message authentication codes (such as hash-based message authentication codes (HMACs), keyed cryptographic hash functions, and other types of information may also be used as digital signatures.

In an embodiment, the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In an embodiment, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") may include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that f(x)=y is below a specified threshold), second preimage resistance (given an input x1, the probably of randomly generating another input x2, different from x1, such that f(x1)=f(x2) is below a specified threshold) and/or collision resistance (the probability of two different inputs resulting in the same output is less than a specified threshold). In an embodiment, the exact threshold for each probability may be context-dependent, with lower probabilities corresponding to higher security contexts. In an embodiment, a value is cryptographically derived using a one-way function. In an embodiment, an encryption function is (or can be a component of) a one-way function from the perspective of an entity that lacks information (e.g., cryptographic key and/or salt) used as input into the encryption function. In an embodiment, hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. The phrase cryptographically derived means using a one way function at least once using inputs that are the values or derived from the values (possibly cryptographically derived from the values). In an embodiment, an encryption operation is one-way to entities that do not have the decryption key.

In an embodiment, a system is said to be configured to trust a public cryptographic key if logic with which the system is configured to operate is dependent on whether an attempt to verify a digital signature with the public cryptographic key is successful. In an embodiment, a system is said to be configured to trust a symmetric cryptographic key if logic with which the system is configured to operate is dependent on whether an attempt to verify a digital signature with the symmetric cryptographic key is successful.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. In an embodiment, the data object may be encrypted so as to be decryptable by the system that will cryptographically verify the data object, where the ability to decrypt the data object serves as cryptographic verification of the data object. In an embodiment, the data object may be digitally signed (thereby producing a digital signature of the data object) such that the digital signature is verifiable by the system that will cryptographically verify the data object. In an embodiment, both encryption and digital signatures are used for cryptographic verifiability and/or security. In an embodiment, the key used to encrypt and/or digitally sign the data object varies in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. In an embodiment, using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. In an embodiment, the data object is digitally signed using a private key of a public/private key pair corresponding to the computer system that encrypts and/or digitally signs the data object (e.g., a user device). In an embodiment, an application is provisioned with the private key and the data object may include a certificate for the private key for use by a system for verification of the digital signature of the data object. In an embodiment, a symmetric key shared between the user computer and the system that cryptographically verifies the data object is used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    generating a sequence of pseudorandom values based at least in part on a cryptographic key and a counter, a pseudorandom value of the sequence of pseudorandom values having a first number of bits;
    truncating the pseudorandom value by a second number of bits to generate a second pseudorandom value and a set of truncated bits;
    combining plaintext with the second pseudorandom value to produce a ciphertext; and
    generating a message authentication code based at least in part on the set of truncated bits.

2. The computer-implemented method of claim 1, wherein the second number of bits are truncated from at least one other pseudorandom value of the sequence of pseudorandom values.

3. The computer-implemented method of claim 1, wherein the sequence of pseudorandom values is generated by encrypting a combination of an initialization vector and a counter, where pseudorandom values of the sequence of pseudorandom values are generated based at least in part on different counters.

4. The computer-implemented method of claim 1, wherein combining the plaintext with the second pseudorandom value to produce a ciphertext further comprises performing an exclusive OR operation between the plaintext and the second pseudorandom value.

5. A system, comprising:
    one or more processors; and
    memory that stores computer-executable instructions that, when executed, cause the one or more processors to:
        obtain a first plurality of values based at least in part on a cryptographic key;
        generate a ciphertext based at least in part on a plaintext and a second plurality of values, wherein the second plurality of values is obtained by at least removing a number of bits from values of the first plurality of values; and
        generate a message authentication code for the ciphertext, the message authentication code generated based at least in part on a third plurality of values corresponding to the number of bits removed from the values of the first plurality of values.

6. The system of claim 5, wherein executing the instructions further causes the system to:
    provide the ciphertext and the message authentication code.

7. The system of claim 6, wherein:
    a first number of bits are disregarded from a first value of the first plurality of values to obtain a second value; and
    the second value is encoded in the message authentication code with an exclusive OR operation.

8. The system of claim 7, wherein a first number of bits are discarded by truncating the first number of bits from each value of the first value.

9. The system of claim 7, wherein:
    executing the instructions further causes the system to provide additional data; and
    the message authentication code is based at least in part on the additional data.

10. The system of claim 9, wherein executing the instructions further causes the system to:
    share the cryptographic key with a receiving computer system; and
    transmit the ciphertext, the additional data, and the message authentication code to the receiving computer system.

11. The system of claim 5, wherein a length of the second plurality of values is at least the length of the plaintext.

12. The system of claim 5, wherein the ciphertext is generated by performing an exclusive NOR operation between the first plurality of values and the plaintext.

13. A non-transitory computer-readable storage medium having stored thereon executable instructions that, as a result of being executed by one or more processors of a computer system, cause the computer system to at least:
    obtain a first plurality of values based at least in part on a cryptographic key;
    generate a plaintext based at least in part on a ciphertext and a second plurality of values, wherein the second plurality of values is obtained by at least truncating a portion of a corresponding value of the first plurality of values; and generate a message authentication code based on a third plurality of values obtained by at least truncating the portion of the corresponding value the first plurality of values.

14. The non-transitory computer-readable storage medium of claim 13, wherein the instructions further comprise instructions that, as a result of being executed by the one or more processors, cause the computer system to:
generate a second message authentication code based at least in part on the ciphertext and the first plurality of values; and
obtain a first message authentication code for the ciphertext.

15. The non-transitory computer-readable storage medium of claim 14, wherein the instructions further comprise instructions that, as a result of being executed by the one or more processors, cause the computer system to:
determine that the first message authentication code does not match the second message authentication code; and
indicate that the ciphertext is not authentic.

16. The non-transitory computer-readable storage medium of claim 13, wherein the instructions further comprise instructions that, as a result of being executed by the one or more processors, cause the computer system to:
acquire plaintext additional data; and
determine that the plaintext additional data is authentic based at least in part on the message authentication code.

17. The non-transitory computer-readable storage medium of claim 13, wherein the instructions further comprise instructions that, as a result of being executed by the one or more processors, cause the computer system to:
exchange information with a sending computer system that allows the computer system to acquire the cryptographic key; and
receive the ciphertext and the message authentication code from the sending computer system.

18. The non-transitory computer-readable storage medium of claim 13, wherein truncating the portion of the corresponding value of the first plurality of values is accomplished by at least disregarding a number of bits of each value of the first plurality of values.

19. The non-transitory computer-readable storage medium of claim 18, wherein disregarding the number of bits is accomplished at least in part by applying a bit mask to each value of the first plurality of values.

20. The non-transitory computer-readable storage medium of claim 13, wherein the plaintext is generated by performing an exclusive OR operation between the first plurality of values and the ciphertext.

* * * * *